United States Patent Office 3,817,705
Patented June 18, 1974

---

3,817,705
MEANS FOR THE INDICATION OF NITRITE
Alfred Stein, Wilhelm Baumer, and Dieter Schmitt, Darmstadt, Germany, assignors to Merck Patent Gesellschaft mit beschrankter Haftung, Darmstadt, Germany
No Drawing. Filed Aug. 10, 1972, Ser. No. 279,340
Claims priority, application Germany, Aug. 19, 1971,
P 21 41 487.9
Int. Cl. G01n 31/22
U.S. Cl. 23—230 R                    10 Claims

ABSTRACT OF THE DISCLOSURE

Detection of nitrite ions, comprising an absorbent support carrier impregnated with particular diazotizable amines, a component coupling with diazonium salts, and an acid.

BACKGROUND OF THE INVENTION

This invention relates to an indicator and process for the colorimetric determination of nitrite ions and methods for the production thereof.

In analytical chemistry, the use of identification reagents for the colorimetric determination of certain ions has become increasingly important. Test strips for the semi-quantitative determinations in a simple manner are particularly desirable.

In particular, it is desirable to have test strips providing a rapid and reliable detection of nitrite ions in foodstuffs and body fluids, as well as for the detection of nitrogen oxides in the air. Nitrite ion detection, for example, in the urine aid in the determination of infections of the urinary tract. Thus, nitrites can be formed, for example, from nitrates by the reductive activity of certain bacteria, such as coli, paracoli, typhus, and paratyphus bacteria, staphylococci, enterococci, etc.

Rapid and reliable nitrite ion detection is also of great importance in determining the potability of drinking water and fitness of foodstuffs. In the interest of environmental protection, reliable means for the instant detection of nitrogen oxides in the air.

Reagents and test papers are known, by which nitrite ions can be detected. The classical reagent for nitrite determination producing a color reaction according to Griess-Ilosvay comprises a solution of α-naphthylamine, sulfanilic acid, and acetic acid. The nitrite in the sample being tested diazotizes the sulfanilic acid, and couples the α-naphthylamine with the diazonium salt to produce a red dye. Disadvantages in the procedure are the low stability of the reagent solution and the relatively high acid concentrations required. Furthermore, the procedure is further complicated wherein attempts to overcome these disadvantages by the use of dry reagents as well as test papers have been proposed [D. Kutter, "Z. klin. Chem." (Periodical of Clinical Chemistry) 2, 63 (1964)]. However, known test papers require long reaction times for obtaining the maximum color depth at a given nitrite ion concentration. In the semiquantitative determination of nitrite ions using a color scale, the maximum color depth should be reached as rapidly as possible for optimum read-off accuracy. The rapidity in the formation of the azo dye is determined by the reaction of the aromatic amine with the nitrite to form the diazonium salt. Therefore, in order to conduct a semiquantitative determination of minor nitrite concentrations with test paper, it is necessary to load the paper with the maximum concentration of a highly-soluble amine, to thereby react as many nitrite ions as possible to form the diazonium salt within a few seconds.

Suitable aromatic amines have been compounds wherein the nucleophilic characteristic of the nitrogen atom is sufficient for a rapid progression of the diazotization reaction and providing a sufficiently positive charging of the diazo group to obtain a rapidly progressing coupling reaction.

It has now been found that the above disadvantages can be avoided by the use of the stable testings of this invention which have a very high sensitivity and an extremely short reaction time which is produced by the use of particular diazotizable amines.

SUMMARY OF THE INVENTION

The indicators of this invention for the detection of nitrite ions comprise an absorbent support impregnated with particular diazotizable amines, a component which couples with diazonium salts, and an acid. In its method of use aspect, this invention relates to a method for the detection and semiquantitative determination of nitrite ions in a test solution employing an indicator of this invention. In its process aspect, this invention relates to the production of an indicator of this invention by the impregnation of an absorbent support with a solution containing a diazotizable amine as defined herein, a component which couples with diazonium salts, and an acid.

DETAILED DESCRIPTION

Suitable absorbent supports or carriers include those customarily employed for the production of indicator reagents. Filter paper is most commonly employed. However, other forms of absorbent cellulose and cellulose derivatives and absorbent products, e.g., polyester fiber and fiber glass laminate can likewise be used.

Suitable diazotizable amines, in accordance with this invention, are compounds of the general formula:

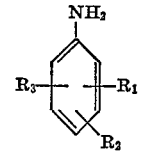

wherein the radical $R_1$ is hydrogen, carboxyl, or a sulfonic acid group, the radical $R_2$ is β-hydroxyethylsulfone or β-hydroxyethylsulfone sulfate and the radical $R_3$ is hydrogen or alkoxy of 1 to 6 carbon atoms.

The preferred diazotizable amines are as follows:

4-aminophenyl-β-hydroxyethyl sulfone,
3-amino-4-carboxylic acid phenyl-β-hydroxyethyl sulfone,
3-amino-4-sulfonic acid-5-methoxyphenyl-β-hydroxyethylsulfone and the corresponding sulfuric acid esters.

Suitable coupling components are N - (1 - naphthyl)-ethylenediamine, α-naphthylamine, N-alkyl-α-naphthylamine, N,N-dialkyl-α-naphthylamine, as well as the salts and α-naphthols thereof, preferably the dichloride and the oxalate of N-(1-naphthyl)-ethylenediamine.

Suitable acids are the solid organic acids, e.g., tartaric acid, citric acid, oxalic acid, malic acid, malonic acid, succinic acid, glutaric acid and/or adipic acid, preferably tartaric acid, citric acid and/or oxalic acid. For example, the absorbent supports, preferably filter paper, can be impregnated with an impregnating solution containing in 100 ml. of water, in 100 ml. of an organic solvent, or in 100 ml. of a mixture of water and organic solvent:

1–2 g. of one or more of the diazotizable amines,
0.1–0.5 g. of the coupling component,
2–8 g. of the solid organic acid.

Suitable organic solvents for the impregnating solution are primarily the lower aliphatic alcohols, particularly methanol. Other readily vaporizing organic solvents which are capable of dissolving the components can also be used.

The absorbent supports are impregnated with the impregnating solution in a conventional manner so that as to provide a pickup of the solution of about 3–10%, preferably about 7%, calculated on the dry weight of the carrier. The impregnated supports are dried in an atmosphere free of nitrogen oxides. The dried supports either can be cut into handy strips, or they can be processed into preferably square pieces. They can be conventionally glued onto plastic films, paper strips, or metallic strips, or sealed onto or into such films or strips.

The indicators of this invention, as they are used for the colorimetric determination of nitrite ions, comprise an absorbent carrier uniformly impregnated (per m.$^2$ for surface area) with 5 to 15 g., preferably 8 to 12 g. of the components from the impregnating solution.

To detect nitrite ions or nitrite-forming bacteria, one of the test strips is immersed into the solution to be tested until the testing zone of the test strip is fully wetted. In the presence of nitrite ions, the test zone assumes a red to reddish purple color in about 2–10 seconds. This coloring is compared with a standard color scale obtained on using solutions of known nitrite ion concentrations. The nitrite ion concentration of the test solution can be readily determined by color comparison with the colors developed with the known nitrite ion solutions. In this semiquantitative manner, distinct shading of the red to red purplish coloring can be perceived between 0, 0.1, 0.2, 0.5, 1, 2, 5, 10, 25, 50, 100, and 200 mg./l. (or p.p.m.) of nitrite ions.

In the case of nitrite contents of above 200 mg./l., the solution to be tested, or an aliquot portion thereof, is first diluted to such an extent that a shading of red coloring lying within the varying standard color scale is obtained. By multiplication, in accordance with the selected dilution, a semiquantitative indication of the concentration of the nitrite ions is also obtained, or conclusions can be drawn therefrom with respect to the germ number of the nitrite-forming bacteria.

As a further aspect of this invention, the above-described diazotizable amines as sulfate esters can be reacted with and affixed to the cellulose fibers of the absorbent carrier. This can be accomplished, for example, by suspending paper fibers in water and adding suitable amounts of the diazotizable amine to fibrous pulp. By the use of an alkali reagent, such as sodium hydroxide, sulfuric acid can be split off from the β-hydroxyethylsulfone sulfate group. The 2-OH group of the cellulose of the fiber is chemically added to the thus-formed vinylsulfone, with the production of an ether bond. Any excess amine, unreacted vinylsulfone, and products formed are alkali- and water-soluble, due to the carboxyl and sulfonic acid groups contained therein, and thus can be readily washed out. The treated fibers can be processed into a paper by conventionally known means. The paper is cut into strips having a width of about 5 mm. and a length of 5–10 cm. A portion of the length of the strip is immersed in the acidified solution to be tested. After the immersed portion of the strip has been saturated, it is bathed in a solution of the coupling component. The portion of the paper immersed in the solution to be tested assumes a red to reddish purple color within 2–10 seconds if nitrite is present. By means of this method, it is possible to detect concentrations as low as 0.01 mg./l. of nitrite ions in a solution.

Instead of cellulose fibers, it is also possible to employ a cellulose powder as the carrier.

In a further aspect of the invention, cellulose powders can be employed as the carriers for the diazotizable amine. Cellulose powders can be treated, as described above for cellulose fibers, to contain a chemically bound diazotizable amine. The treated powders can be used, for example, to separate nitrite from nitrate ions contained in an acidified solution. The procedure involves adding the powder to the solution, thoroughly mixing for a required period of time to permit all the nitrite ions to react with the diazotizable amine on the powder, and subsequently filtering the powder from the solution. The nitrate ions remaining in the solution, can be reduced to nitrite ions by conventional means, such as by reduction with cadmium. Accordingly, the detection and semi-quantitative determination of the nitrite ions obtained in the solution by the reduction of nitrate ions can be made by the procedures heretofore described.

Indicator papers having the diazotizable amine chemically bonded to the cellulose can be subsequently diazotized and used for the detection of bilirubin.

The procedures and indicators of the present invention can also be used for the determination of nitrogen oxides in the air and in particular, nitrogen dioxide. For this purpose, the impregnated test paper is moistened with nitrite-free water and exposed for about 2 minutes to a sample of air to be tested. The exposed paper having a characteristic color is compared with a standard color scale constructed from known concentrations of nitrogen oxides in air. A concentration of 1 p.p.m. (cm.$^3$/m.$^3$) of nitrogen dioxide in the air produces the same color hue in a test strip as 1 mg./l. concentration of nitrite ions in solution. The color scale, suitable for certain nitrite ion determinations, is therefore also suitable for nitrogen dioxide determinations. By exposing the moistened test paper to the sample of air to be tested for 10 minutes, concentrations as low as 0.1 p.p.m. of nitrogen dioxide can still be detected with certainty. During this procedure, the nitrogen oxides are, in part, converted into nitrite on the moist test paper.

The indicators of the invention are suitable for rapid semiquantitative determination of nitrite ions in various mediums, such as drinking water, body fluids such as urine, foodstuffs such as meat and cold cuts, such as sausages, into which are mixed with a nitrite for reddening purposes, etc.

The particular advantages of the use of the indicators of the invention over detection procedures heretofore is the obtention of maximum color depth within a few seconds after immersion of the indicator test strips in a test solution. Accordingly, good linear correlation is obtained between the nitrite ion concentration and the evolving color depth.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Filter paper (No. 2316 or 1450 CV Schleicher and Schüll) is impregnated with the following solution:

1.0 g. of 3-amino-4-carboxylic acid phenyl)-β-hydroxyethylsulfone sulfate,
0.2 g. of N-naphthyl)-ethylenediammonium dichloride,
3.0 g. of tartaric acid,
100 ml. water The impregnated paper is dried in air free of nitrogen oxides. The dried filter paper is cut into small squares of about 6 x 6 mm. and glued to plastic strips of 6 x 60 mm. at the lower end thereof.

Upon immersion of the test strip into a nitrite ion containing urine specimen, the nitrite ion concentration can be determined in a few seconds with the aid of a standard color scale prepared from known nitrite ion concentrations in urine specimens.

EXAMPLE 2

This example is conducted analogously to Example 1, but the impregnating solution is as follows:

3,0 g. of (3-amino-4-carboxylic acid phenyl)-β-hydroxyethylsulfone sulfate, 0.5 g. of N - (1 - naphthyl)-ethylenediammonium dichloride.
3.0 g. of tartaric acid,
100 ml. water.

Analogous results are obtained when in place of the (3 - amino - 4 - carboxylic acid phenyl) - β - hydroxyethylsulfone sulfate in Example 1 a like amount of one of the following compounds is used:

(4-aminophenyl)-β-hydroxyethylsulfone
(3 - amino - 4 - carboxylic acid phenyl)-β-hydroxyethylsulfone
(3 - amino - 4 - sulfonic acid phenyl) - β - hydroxyethylsulfone
3 - amino - 4 - sulfonic acid 5 - methoxyphenyl)-β-hydroxyethylsulfone
(4-aminophenyl)-β-hydroxyethylsulfone sulfate
(3 - amino - 4 - sulfonic acid phenyl)-β-hydroxyethyl sulfone sulfate
(3 - amino - 4 - sulfonic acid 5 - methoxyphenyl)-β-hydroxyethylsulfone sulfate.

EXAMPLE 3

This example is conducted analogously to Example 1 except that the 3 g. of tartaric acid are replaced by 5 g. of tartaric acid, e.g., citric acid, or 5 g. oxalic acid, or 5 g. of mixtures thereof. The components of the solution are dissolved in 100 ml. of methanol or in a mixture of 100 ml. methanol/water in a ratio of 3:1, instead of being dissolved in 100 ml. water. Analogous results are obtained.

EXAMPLE 4

An indicator paper is prepared analogously to Example 1, except that N-(1-naphthyl)ethylenediammonium oxalate is employed in the impregnating solution instead of N-(1-naphthyl)-ethylenediammonium dichloride and analogous results are obtained.

EXAMPLE 5

4 g. of (3-amino-4-carboxylic acid phenyl)-β-hydroxyethylsulfone sulfate is dissolved in 300 ml. of water and mixed with 10 g. of cellulose fibers under agitation. To the mixture are added 30 g. of sodium chloride and 4 g. of sodium carbonate. After 30 minutes, 50 ml. of 1 N sodium hydroxide solution is added dropwise under agitation. The fibrous pulp is vacuum-filtered after one hour and washed with 2 l. of water. A paper is produced from the fibrous pulp in a conventional manner on a Fourdrinier paper machine. The paper is cut into strips of a width of about 5 mm. and a length of 5–10 cm.

A portion of the length of the strip is immersed in an acidified nitrite ion containing sample solution. After the immersed portion of the strip has become saturated, it is bathed in a 1% aqueous solution of N-(1-naphthyl)-ethylenediammonium dichloride, during which step the portion of the paper strip previously immersed into the test solution assumes a red to reddish purple color within a few seconds. By comparison with a standard color scale, the nitrite ion content can easily and immediately be read. By means of this method, concentrations as low as 0.01 mg./l. of nitrite ions can be detected with certainty. In place of cellulose fibers, cellulose powders can also be utilized with the same results.

EXAMPLE 6

1 g. of salt meat is mixed with 3.5 ml. of water and triturated with 0.5 g. of sea sand in a mortar. The mixture is allowed to settle, and the nitrite ion content of the solution on top of the mixture is determined by immersion of a test paper prepared in accordance with the preceding examples.

With a content of 100 mg. of nitrite ion per kg. of salt meat, a nitrite ion content of 25 p.p.m. was indicated by comparison of the coloring produced on the test paper with a standard color scale prepared for the particular test paper.

EXAMPLE 7

A test paper produced according to Example 1 is moistened with nitrite ion free water and exposed for 2 minutes to air which contains nitrogen oxide having a concentration of 1 cm.$^3$/m.$^3$ of nitroegn dioxide. Upon comparison of the coloring produced on the test paper with a standard appended color scale for nitrite ion concentrations, a content of nitrogen dioxide is found which corresponds to one p.p.m. of nitrite. Similarly, other determinations can be made for other p.p.m. contents of nitrogen dioxide in air. By exposing the moistened test paper for about 10 minutes to the air to be tested, it is possible to detect with certainty concentrations as low as 0.1 p.p.m. of nitrogen dioxide.

The preceding examples can be repeated with similar success by substituting the generically or specifically described reactions and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An indicator for the colorimetric determination of nitrite ions comprising an absorbent support uniformly impregnated with a diazotizable amine, a coupling component, and a solid organic acid, said diazotizable amine being a compound of the general formula

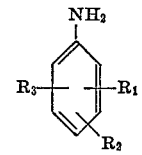

wherein the radical $R_1$ is hydrogen, carboxyl, or a sulfonic acid group, wherein the radical $R_2$ is β-hydroxyethylsulfone or the corresponding sulfuric acid ester, and the radical $R_3$ is hydrogen or alkoxy.

2. The indicator according to claim 1, wherein said amine is present as the diazonium salt.

3. The indicator of claim 1, wherein said diazotizable amine is (3-amino-4-carboxylic acid phenyl)-β-hydroxyethylsulfone sulfate.

4. The indicator of claim 1, wherein said diazotizable amine is (4-aminophenyl)-β-hydroxyethylsulfone sulfate.

5. The indicator of claim 1, wherein said coupling component is N-(1-naphthyl)-ethylenediammonium dichloride.

6. The indicator of claim 1, wherein said coupling component is N-(1-naphthyl)-ethylenediammonium oxalate.

7. The indicator of claim 1, wherein said acid is selected from the group consisting of tartaric acid, citric acid, oxalic acid, maleic acid, malonic acid, succinic acid, glutaric acid, adipic acid, and mixtures thereof.

8. An indicator for the colorimetric determination of nitrite ions comprising a cellulose absorbent support uniformly impregnated with a coupling agent and having chemically bonded thereto a diazotizable amine compound of the general formula

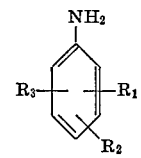

wherein the radical $R_1$ is hydrogen, carboxyl, or a sulfonic acid group, wherein the radical $R_2$ is β-hydroxyethylsulfone or the corresponding sulfuric acid ester, and the radical $R_3$ is hydrogen or alkoxy.

9. A process for preparing an indicator according to claim 1, which comprises impregnating the absorbent support with an impregnating solution containing, by weight:

1–2% of said diazotizable amine
0.1–0.5% of said coupling agent
2–8% of said solid organic acid.

10. A method for the colorimetric determination of nitrite ions in solution comprising chemically adding a diazotizable amine to a cellulose absorbent support, acidifying said nitrite ion-containing solution, immersing said absorbent support in said acidified solution, and thereafter immersing said absorbent support in a solution of a coupling agent, said amine being a compound of the general formula

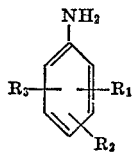

wherein the radical $R_1$ is hydrogen, carboxyl, or a sulfonic acid group, wherein the radical $R_2$ is β-hydroxyethylsulfone or the corresyonding sulfuric acid ester, and the radical $R_3$ is hydrogen or alkoxy.

References Cited

UNITED STATES PATENTS

| | | | |
|---|---|---|---|
| 3,375,079 | 3/1968 | Lyshkow | 23—232 R |
| 3,415,717 | 12/1968 | Avakian | 195—100 |
| 3,547,780 | 12/1970 | Finnerty | 23—253 TP X |
| 3,712,853 | 1/1973 | Rittersdorf et al. | 23—253 TP X |

JOSEPH SCOVRONEK, Primary Examiner

T. W. HAGAN, Assistant Examiner

U.S. Cl. X.R.

23—230 B, 253 TP; 252—408